United States Patent [19]
Puetz et al.

[11] Patent Number: 5,390,751
[45] Date of Patent: Feb. 21, 1995

[54] PLANETARY STEERING SYSTEM FOR A SKID-STEERED VEHICLE

[75] Inventors: Craig A. Puetz, Waterloo; Mervin P. Kizlyk, Cedar Falls, both of Iowa; James A. Nagorcka, Tarrington, Australia

[73] Assignee: Deere & Company, Moline, Ill.

[21] Appl. No.: 154,838

[22] Filed: Nov. 19, 1993

[51] Int. Cl.$^6$ ............................................. B62D 11/18
[52] U.S. Cl. ..................................... 180/6.48; 180/6.3; 475/24; 475/28
[58] Field of Search ................... 180/6.1, 6.3, 6.48; 475/24, 28

[56] References Cited

U.S. PATENT DOCUMENTS 4,997,412  3/1991  Reed ....................................... 475/24
5,076,377 12/1991  Frazer ................................... 180/6.48

Primary Examiner—Mitchell J. Hill

[57] ABSTRACT

The present invention is directed to a planetary steering system for a skid steered vehicle. A prime mover directs rotational motion through right and left drive shafts having planetary carriers with planet gears. The planet gears of the right and left planetary carriers rotate around a right and left sun gears that are coupled to right and left hydraulic steering motors. The planet gears rotate in right and left ring gears that are coupled to the right and left drive wheels of the vehicle. By rotating the motors the speed of the drive wheels can be independently controlled.

4 Claims, 2 Drawing Sheets

PLANETARY STEERING SYSTEM FOR A SKID-STEERED VEHICLE

BACKGROUND OF THE INVENTION

1. Field of the Invention

The present invention is directed to a planetary steering system for a tracked vehicle, wherein the speed of the left and right driving wheels can be independently controlled.

2. Description of the Prior Art

There are three basic methods for steering skid-steered vehicles. These methods include (1) clutch/brake systems, (2) hydrostatic systems, and (3) planetary steering systems. In clutch/brake systems, the inner drive wheel in a turn is slowed or stopped by brakes as the outer drive wheel continues to rotate. In hydrostatic systems, hydraulic motors drive the drive wheels independently of one another. In a hydrostatic system the inner drive wheel in a turn can be slowed, stopped or reversed, and the outer drive wheel speeded up. In hydrostatic systems these operations maybe combined as desired. In a typical planetary steering system, a single hydraulic motor subtracts speed from the inner drive wheel and adds speed to the outer drive wheel when making a turn. The single hydraulic motor engages left and right planetary gearing assemblies associated with each respective drive wheel.

Dual hydraulic motor planetary steering systems have been proposed, see U.S. Pat. No. 4,917,200. Of particular interest is the embodiment illustrated in FIG. 3 of this patent. In this embodiment the prime mover drives an axle that forms the ring gear of port and starboard planetary assemblies. The sun gear of each planetary assembly is driven by the respective port and starboard hydraulic motors. The output shafts of the planetary assemblies are connected to the port and starboard drive wheels. The hydraulic motors are coupled to the sun gears by locking worm gear assemblies.

U.S. Pat. No. 5,139,465 discloses a two-path hydromechanical transmission system. At low tramming speeds the transmission system utilizes a two-path hydrostatic transmission. At high tramming speeds the system uses a two-path hydromechanical transmission. In high tramming speed operations, the speed of the hydrostatic motors are differentiated for steering.

SUMMARY

With the present invention the prime mover drives a right drive shaft and a left drive shaft. The left and right drive shafts are provided with right and left planetary carriers having planet gears. Right and left sun gears are coupled to the respective planets and to right and left hydraulic steering motors. Right and left ring gears are coupled to the planets and the right and left drive wheels. The sun gears are provided with a radially extending portion that engages a spur gear which is driven by the pinion of the respective steering motor.

In normal straight ahead and reverse operations the steering motors are not driven, but act as brakes on the sun gear. When turning, the steering motors are selectively actuated to steer the vehicle. For example, one strategy for a left turn would be to use the left hydraulic motor to slow down the left wheel and maintain the right wheel at its present speed by keeping the right hydraulic motor stationary thereby continuing to brake the right sun gear. Other strategies are also possible, including speeding up the right wheel, and combinations wherein the speed of one wheel is increased and the speed of the other wheel decreased by the steering motors.

It should be noted that at very slow or creeping speeds the hydraulic motors alone could be used to drive the vehicle.

DETAILED DESCRIPTION

Figure 1:
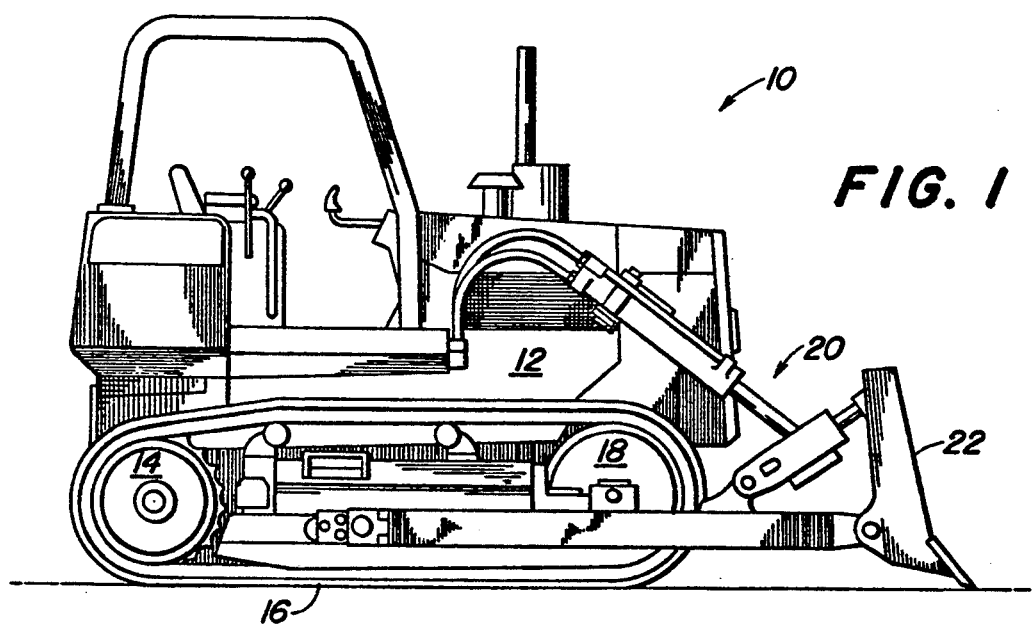
FIG. 1 is a right side view of a track vehicle.

A skid steered vehicle such as crawler 10, illustrated in FIG. 1, comprises a supporting structure 12 housing an internal combustion engine and transmission for driving drive wheels 14. A track 16 is entrained around the drive wheel 14 and the idler 18. Track rollers located between the drive wheel and the idler also engage the track 16. The crawler is provided with suitable linkage and hydraulic cylinders 20 to manipulate bulldozer blade 22.

The transmission is provided with a main drive shaft 24 which extends axially from the transmission to a right angle splitter gear box 26. The right angle splitter gear box 26 directs rotational motion from the main drive shaft 24 to the right and left drive shafts 28 and 30, respectively. The right and left drive shafts are operatively coupled to the right angle splitter gear box 26 by splines 29 and 31. This acts to lock these shafts together as they are driven at the same rotational speed and act as a single drive shaft.

The outer ends of the right and left drive shafts 28 and 30 are provided with right and left planetary carriers 32 and 34. The planetary carriers 32 and 34 are provided with internal splines 33 which engage external splines 35 formed on the drive shafts 28 and 30. Both planetary carriers are provided with three planet gears 36 that are rotatively mounted on stub axles 37. The planet gears rotate around right and left sun gears 38 and 40, respectively. The sun gears are provided with radially extending rings 42 having geared surface 44. The geared surfaces 44 of the sun gear rings 42 are engaged by right and left spur gears 46 and 48. The right and left spur gears 46 and 48 are rotatively mounted on axles 45 and are driven by the pinion gears 50 of right and left hydraulic motors 52 and 54.

Right and left ring gears 56 and 58 also engage planet gears 36. The right and left ring gears are coupled to right and left drive wheels by right and left final drive shafts 60 and 62. In straight ahead or straight reverse operations the high pressure hydraulic motors do not rotate and act to brake the sun gear, so power from the right and left drive shafts 28 and 30 is transferred through the right and left planetary carriers 32 and 34 to planet gears 36 and then to right and left ring gears 56 and 58.

The right and left hydraulic motors can be rotated clockwise or counterclockwise. Therefore the motors can add or subtract from the speed of the right and left ring gears 56 and 58. For example in a right turn the right hydraulic motor would be rotated clockwise which would slow the planet gears 36 and thereby slow the right ring gear 56. This would cause the right drive wheel to slow. As the left drive wheel would be driven at the same speed as before the vehicle would turn to the right.

By having independent control of both motors, different turning strategies can be employed. For example, the right wheel maybe slowed by two miles per hour while the left drive wheel speed up by 1 mile per hour, or instead of slowing the right wheel the left wheel maybe speed up to turn. In addition, at slower speeds the wheels maybe counterrotated.

Figure 3:
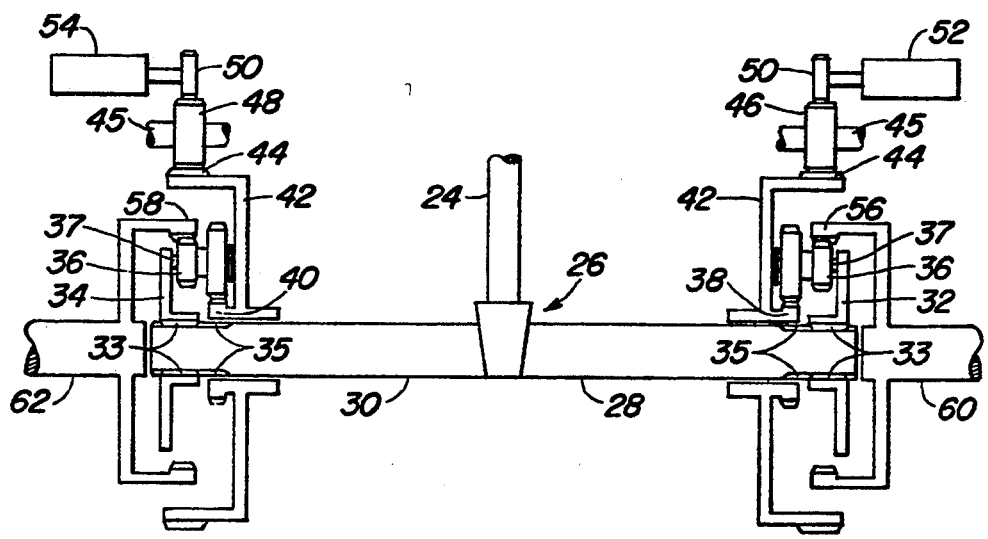
FIG. 3 is a cross sectional view of the steering system.
Figure 2:
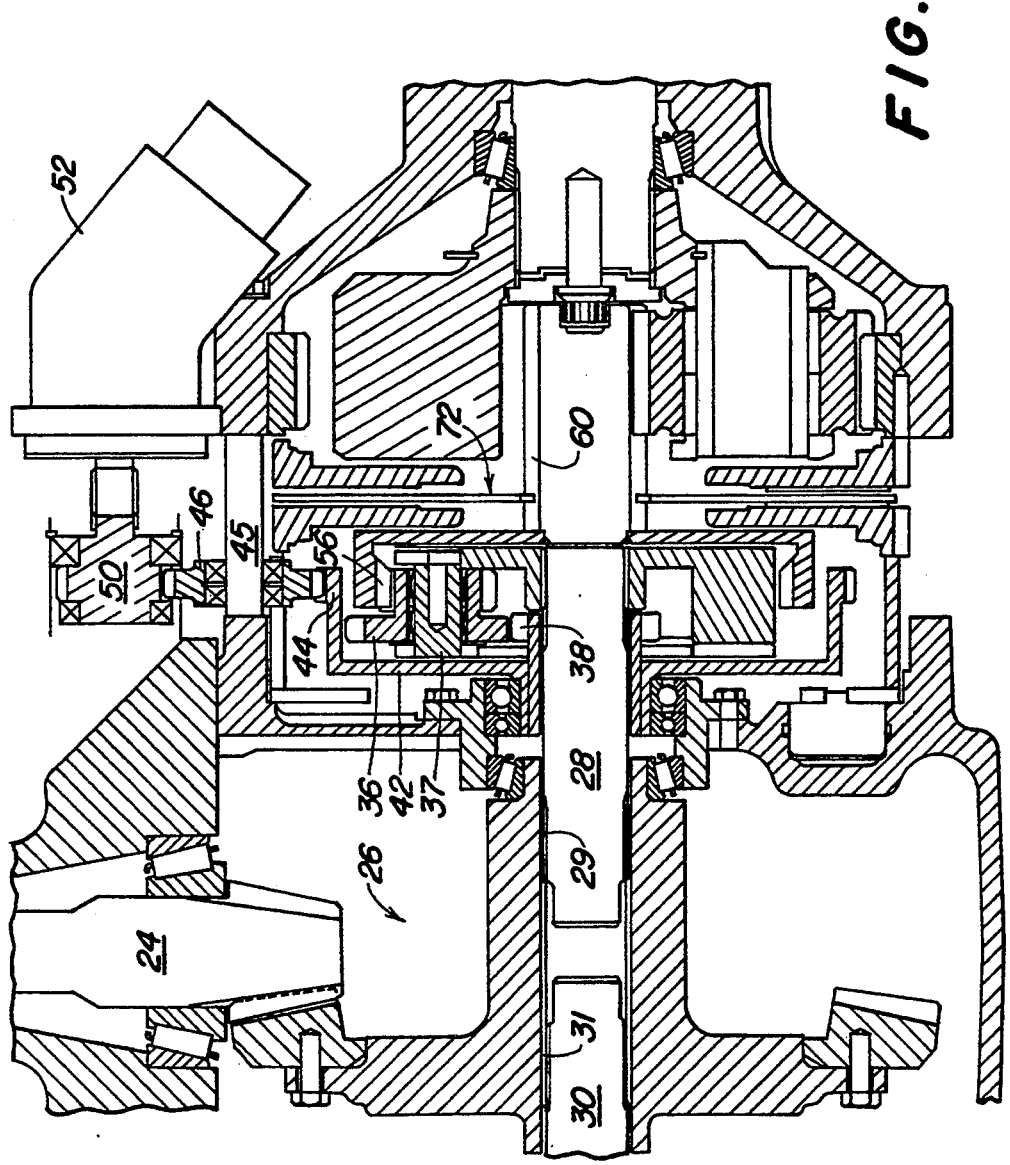
FIG. 2 is a mechanical schematic of the steering system

As shown in FIG. 3 the steering system can be arranged in a compact configuration which also provides room for service brakes 72, only right service brake shown. The hydraulic motors can be incorporated into compact hydrostatic pump/motor sets.

The present invention should not be limited by the above described embodiment, but should be limited solely by the claims that follow.

We claim:

1. A steering system for a tracked vehicle, the steering system comprising:
   a main drive shaft;
   a right drive shaft being driven by the main drive shaft, the right drive shaft being provided with a right planetary carrier having planet gears mounted thereon;
   a left drive shaft being driven by the main drive shaft, the left drive shaft being provided with a left planetary carrier having planet gears mounted thereon;
   means for locking the right and left drive shafts together;
   a right sun gear contacts the planet gears of the right planetary carrier;
   a left sun gear contacts the planet gears of the left planetary carrier;
   a right hydraulic motor rotates the right sun gear;
   a left hydraulic motor rotates the left sun gear;
   a right ring gear contacts the planet gears of the right planetary carrier, the right ring gear is coupled to a right wheel for rotating the right wheel;
   a left ring gear contacts the planet gears of the left planetary carrier, the left ring gear is coupled to a left wheel for rotating the left wheel;
   whereby the left and right hydraulic motors add or subtract rotational speed of the right and left wheels independently of each other.

2. A steering system as defined by claim 1 wherein the right and left hydraulic motors are provided with drive pinions for driving the right and left sun gears, respectively.

3. A steering system as defined by claim 2 wherein the right sun gear is provided with a radially extending ring which is driven by the right hydraulic motor, and the left sun gear is provided with a radially extending ring which is driven by the left hydraulic motor.

4. A steering system as defined by claim 3 wherein a right intermediate spur gear is interposed between the radially extending ring of the right sun gear and the drive pinion of the right hydraulic motor, and a left intermediate spur gear is interposed between the radially extending ring of the left sun gear and the drive pinion of the left hydraulic motor.

* * * * *